(12) United States Patent
Jacomb-Hood et al.

(10) Patent No.: US 9,573,702 B1
(45) Date of Patent: Feb. 21, 2017

(54) DEPLOYED RADAR PANEL FOR SPACE SITUATIONAL AWARENESS

(71) Applicant: Lockheed Martin Corporation, Bethesda, MD (US)

(72) Inventors: Anthony W. Jacomb-Hood, Yardley, PA (US); Bonnie G. Martin, Lumberton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 595 days.

(21) Appl. No.: 14/228,115

(22) Filed: Mar. 27, 2014

(51) Int. Cl.
| | | |
|---|---|---|
| *B64G 1/44* | (2006.01) | |
| *B64G 1/24* | (2006.01) | |
| *G01S 13/04* | (2006.01) | |
| *G01S 13/87* | (2006.01) | |
| *H01Q 1/28* | (2006.01) | |
| *B64G 1/10* | (2006.01) | |
| *G01S 13/02* | (2006.01) | |

(52) U.S. Cl.
CPC . *B64G 1/24* (2013.01); *B64G 1/10* (2013.01); *B64G 1/443* (2013.01); *G01S 13/04* (2013.01); *G01S 13/87* (2013.01); *H01Q 1/288* (2013.01); *G01S 2013/0245* (2013.01)

(58) Field of Classification Search
CPC ............. B64G 1/10; B64G 1/24; B64G 1/443; G01S 13/04; G01S 13/87
USPC .................. 244/76 R, 164, 3.15, 3.16, 3.17, 3.19,244/172.7
See application file for complete search history.

(56) References Cited

U.S. PATENT DOCUMENTS

| | | | |
|---|---|---|---|
| 8,193,968 B1 * | 6/2012 | Kia ........................... | B64G 3/00 342/118 |
| 8,833,702 B2 * | 9/2014 | Briskman ................ | B64G 1/24 244/158.6 |
| 2010/0253567 A1 * | 10/2010 | Factor ....................... | G01S 7/36 342/52 |
| 2013/0147952 A1 * | 6/2013 | Englert .................... | B64G 1/66 348/144 |

* cited by examiner

*Primary Examiner* — Richard G Davis
(74) *Attorney, Agent, or Firm* — McDermott Will & Emery LLP

(57) ABSTRACT

A monitoring system for a satellite is disclosed. The satellite includes a bus, an optical sensor configured to optically detect objects in a first zone extending from the satellite, and a solar assembly comprising a solar panel and a radar device. The radar device can be configured to detect objects in a second zone, different from the first zone, extending from the satellite in a direction transverse to a surface of the solar panel.

16 Claims, 4 Drawing Sheets

DEPLOYED RADAR PANEL FOR SPACE SITUATIONAL AWARENESS

STATEMENT REGARDING FEDERALLY SPONSORED RESEARCH OR DEVELOPMENT

Not applicable.

FIELD

The present disclosure generally relates to satellites and, in particular, for example, mechanisms for sensing and monitoring nearby objects.

BACKGROUND

Satellites orbiting the planet, such as Earth, can be susceptible to damage caused by nearby objects or debris. Such objects may pose a risk of collision with the satellite, undesired observation of the satellite, interference with the satellite, or other incidental or malicious harm that could disrupt the integrity, orbit, or operation of the satellite.

SUMMARY

In one or more aspects, this disclosure describes a satellite adapted to detect objects nearby while in orbit about a planet. The satellite includes at least one radar device for detecting nearby objects in a zone between the satellite and a sun.

According to certain embodiments, a satellite includes: a bus; an optical sensor configured to optically detect objects in a first zone extending from the satellite; and a solar assembly including a solar panel and a radar device configured to detect objects in a second zone, different from the first zone, extending from the satellite in a direction transverse to a surface of the solar panel.

According to certain embodiments, the solar assembly can be rotatable relative to the bus. The satellite can further include a control module configured to control an orientation of the solar assembly relative to the bus, such that the surface of the solar panel faces a sun. When the surface of the solar panel faces the sun, the second zone can extend from the satellite toward the sun. The satellite can further include a plurality of additional optical sensors, each of the plurality of additional optical sensors being configured to optically detect objects in a respective additional zone extending from the satellite, each of the respective additional zones being different from the first zone and different from every other of the additional zones. The first zone and the additional zones can collectively and entirely surround the satellite in three-dimensional space. The second zone can at least partially overlap one or more of the additional zones. The radar device can include a phased array antenna.

According to certain embodiments, a method of detecting objects near a satellite in orbit about a planet, includes: by an optical sensor of the satellite, optically detecting whether objects are present in a first zone extending from the satellite; and by a radar device of the satellite, detecting whether objects are present in a second zone, different from the first zone, extending from the satellite toward a sun.

According to certain embodiments, the method can further include orienting a solar assembly of the satellite relative to a bus of the satellite, the solar assembly including a solar panel and the radar device, such that a surface of the solar panel faces the sun. The solar assembly can be oriented such that the second zone extends from the satellite in a direction transverse to a surface of the solar panel. The method can further include, if an object is detected in the first zone or the second zone, transmitting a notification signal to a remote receiver on the planet, on another satellite, or otherwise located remotely from the satellite. The method can further include, if an object is detected in the first zone or the second zone, moving the satellite relative to the object. The method can further include, by a plurality of additional optical sensors, detecting whether objects are present in a plurality of additional zones, each of additional zones extending from the satellite, each of the additional zones being different from the first zone and different from every other of additional zones. The first zone and the additional zones can collectively and entirely surround the satellite in three-dimensional space. The second zone can at least partially overlap one or more of the additional zones. The solar assembly can further comprise a plurality of solar panels, the radar device being powered by one of the solar panels, and the radar device being configured to not draw power from the bus. The solar assembly can further comprise a plurality of solar panels, wherein each of the plurality of solar panels is connected to an adjacent solar panel by a mechanism, and one of the plurality of solar panels at a terminal end of the solar assembly contains the radar device.

According to certain embodiments, a satellite can include: a plurality of radar devices, each of the plurality of radar devices being configured to detect objects in a respective zone extending from the satellite, each of the respective zones being different from every other of the additional zones, wherein the zones collectively and entirely surround the satellite in three-dimensional space.

According to certain embodiments, the zones can at least partially overlap. The satellite can further include: a bus, wherein at least some of the plurality of radar devices are mounted on the bus; and a solar assembly rotatable relative to the bus and including a solar panel, wherein at least some of the plurality of radar devices are mounted on the solar assembly. Each of the radar devices can include a phased array antenna.

In the following description, specific embodiments are described to show by way of illustration how the invention can be practiced. It is to be understood that other embodiments can be utilized and changes can be made without departing from the scope of the present invention.

DETAILED DESCRIPTION

Disclosed herein are various embodiments of satellites adapted to detect objects nearby while in orbit about a planet. According to certain embodiments, a satellite of the subject technology may monitor various regions of space about the satellite for detecting whether nearby objects are within a zone near the satellite. According to certain embodiments, a satellite of the subject technology may utilize optical sensors, radar, and other mechanisms for detecting nearby objects.

Figure 1:
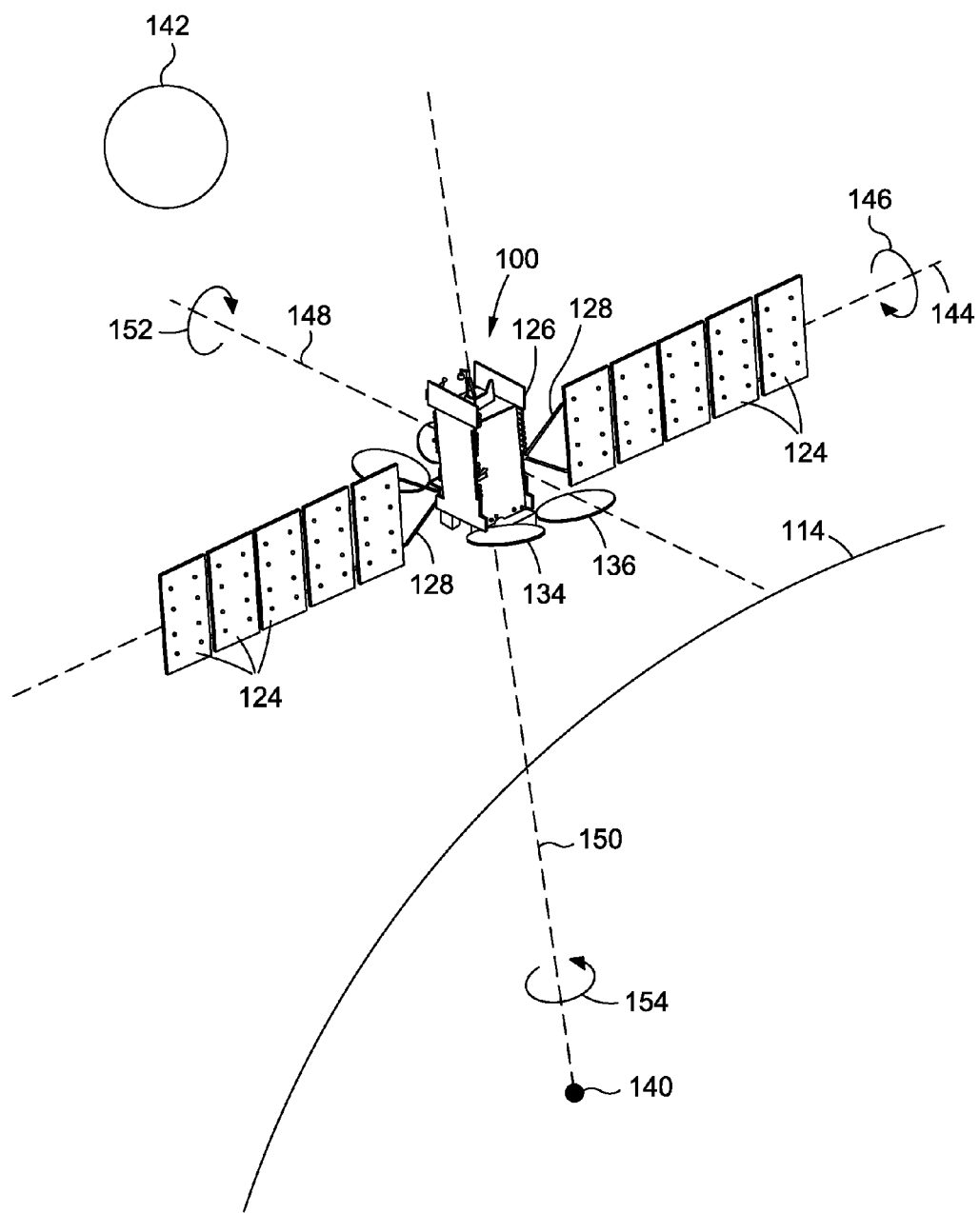
FIG. 1 illustrates a satellite in orbit around a planet, according to certain aspects of the present disclosure.

According to certain embodiments, as shown in FIG. 1, a satellite 100 can be above the surface of the earth 114. The orientation and flight path of the satellite 100 can be considered with respect to three axes: a yaw axis 150, a pitch axis 144, and a roll axis 148, about which the satellite 100 may undergo yaw 154, pitch 146 and/or roll 152, respectively. Each axis is orthogonal to every other axis. According to certain embodiments, the transmission antenna 134 and the reception antenna 136 can continuously point directly towards a position on the surface of the earth 114. The solar panels 124 are rotated relative to the bus 126 by the yoke 128. Rotation may occur about the pitch axis 144 or another axis transverse to a side of the bus 126, by means well known in the art. The solar panels 124 can be maintained so as to point in a direction towards the sun 142 while the transmission antenna 134 and/or the reception antenna 136 are pointed towards the earth 114.

The bus 126 can execute a pitch and/or roll rotation so that the transmission antenna 134 and the reception antenna 136 are always pointed towards the nadir 140. Simultaneously, the solar panels 124 can be rotated relative to the bus 126 by the yoke 128 about a pitch axis 144 to remain pointed in a direction towards the sun 142.

The position and orientation of the satellite 100 can be maintained in a geostationary orbit around the earth 114 while continuously orienting the solar panels 124 toward the sun 142 and orienting the antennae 134, 136 toward the earth. This arrangement has the advantages of permitting multiple ground stations to continually use the satellite 100 without interruption while the satellite 100 gains the maximum benefit from the solar energy incident to its solar collectors. The position and orientation of a satellite 100 in a geostationary orbit can be occasionally adjusted to counteract forces resulting from solar pressure, oblateness of the earth, and solar and lunar gravitational perturbations that can eventually alter the satellite's position and orientation beyond acceptable limits. Various techniques for compensating for disturbing effects on satellites are known, as discussed further herein.

Figure 2:
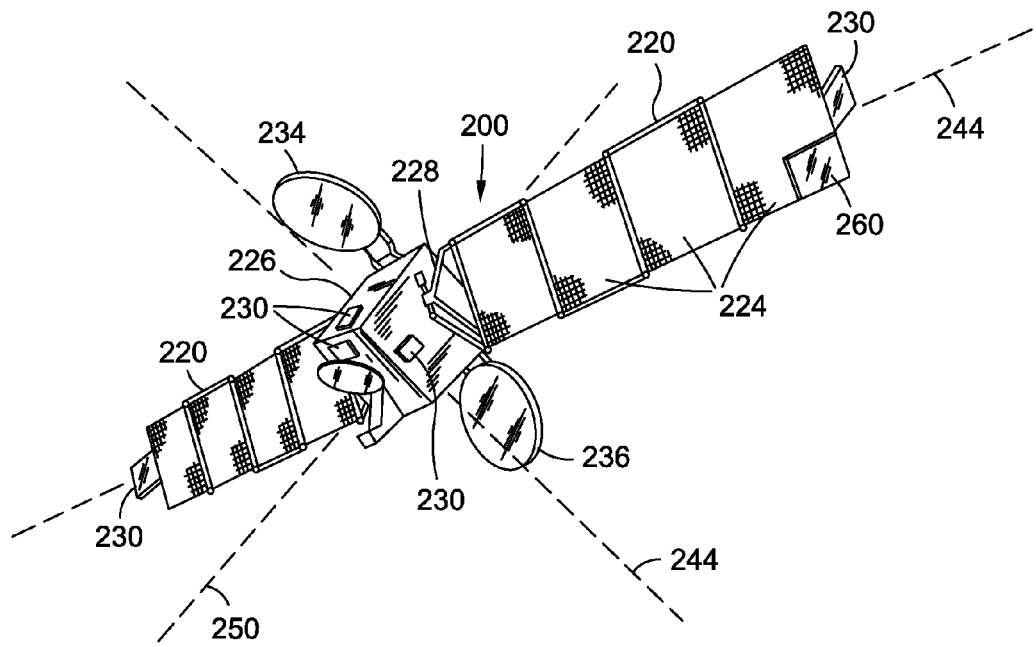
FIG. 2 illustrates a satellite having optical sensors and a radar device for sensing objects, according to certain aspects of the present disclosure.

According to certain embodiments, as illustrated in FIG. 2, a satellite 200 includes a bus 226 and one or more solar assemblies 220. The satellite 200 may further include a transmission antenna 234 and a reception antenna 236. Each of the solar assemblies 220 includes one or more solar panels 224. The solar assemblies 220 are each attached to the bus 226 and supported by a yoke 228. The solar panels 224 form arrays wherein adjacent solar panels 224 are hinged together. The solar panels 224 are deployed by unfolding and extending away from the bus 226. The yoke 228 is pivotally mounted on a side of the bus 226 for rotation relative to the bus 226 about a pitch axis 244. In a deployed position, the solar panels 224 of a given solar assembly 220 can be mutually coplanar and extend transversely of the bus 226.

The solar panels 224 produce electrical energy in a known fashion. The produced electrical energy can be provided to components of the satellite 200 or stored in an electrical battery or other power supply or electrical storage for satisfying peak loads and for those intervals in which the solar panels 224 can be in a shadow. The solar panels 224 can be rigid components of an array.

According to certain embodiments, one or more optical sensors 230 can be provided on the bus 226, a solar assembly 220, and/or a plurality of solar assemblies 220. As shown in FIG. 2, the optical sensors 230 can be oriented such that they face different directions. Accordingly, the optical sensors 230 can be directed so as to capture images in respective zones of three-dimensional space about the satellite 200. Any one of the zones can be different from any other zone. Accordingly, one or more optical sensors 230 can be used to capture images of a space partially or entirely surrounding the satellite 200. The space can be divided into zones, each zone corresponding to a portion of space in which a respective optical sensor 230 monitors. The zones can be overlapping, contiguous, or separated.

As shown in FIG. 2, optical sensors 230 can be provided on outer surfaces of the bus 226, such that the optical sensors 230 are each aligned with a coordinate axis. For example, pairs of optical sensors 230 can be oriented to face in opposite directions on one of a yaw axis 250, a pitch axis 244, and a roll axis 248. In this arrangement, the three-dimensional space about the satellite 200 can be divided into at least six zones. Alternatively or in combination, one or more optical sensors 230 can be provided on one or more solar assemblies 220. As shown in FIG. 2, an optical sensor 230 located on a solar assembly 220 can be oriented such that it faces a direction parallel to an axis of rotation (e.g., pitch axis 244) of the solar assembly 220. As such, the optical sensor 230 maintains a substantially similar captured zone in any rotational orientation of the solar assembly 220. The optical sensor 230 can be substantially flat. In a deployed position, the optical sensor 230 may lie in a plane substantially transverse (e.g. orthogonal) to an adjacent solar panel 224. In a retracted position, the optical sensor 230 may fold against an adjacent solar panel 224.

According to certain embodiments, the optical sensor 230 is any device configured to receive and detect light or other electromagnetic radiation emitted or reflected by an object in the vicinity of the satellite 200. For example, the optical sensor 230 can be a camera, including, by further example, a lens, a charged coupled device (CCD), and/or storage media for capturing images. It will be appreciated that an optical sensor 230 can detect visible light as well as radiation on other sections of the electromagnetic spectrum, such as infrared radiation and ultraviolet radiation.

According to certain embodiments, one or more radar devices 260 can be provided on or along a solar panel 224 of a solar assembly 220. The radar device 260 can be fixed to a solar panel 224 such that the radar device 260 has the same orientation as the solar panel 224 to which it is fixed. Accordingly, the radar device 260 can be directed or aimed in a direction transverse (e.g. orthogonal) to the surface of the solar panel 224 to which it is fixed. As the solar panel 224 is adjusted to track the sun, the radar device 260 also is directed toward the sun, such that a zone monitored by the radar device 260 lies between the satellite 200 and the sun.

Radar systems are widely used for detecting and locating objects. Radar systems typically operate in the UHF (Ultra-High-Frequency) or microwave portion of the RF (Radio-Frequency) spectrum and are used to determine the position and/or movement of an object. Various types of radar systems are known for different purposes and applications.

Radar systems can locate a target by finding its direction and range. The range to an object is determined by calculating the delay between a pulse transmitted by the system, and the consequential receipt of the reflection of said pulse from the object. This determination is based on the known propagation velocity of the pulse. Suitable range resolution can be achieved by transmission of short pulses. The duration of a pulse can be shortened by any known compression technique.

According to certain embodiments, each of one or more radar devices 260 can be a phased array antenna. According to certain embodiments, architecture of a radar device 260, can include one or more building blocks in the form of "tiles" wherein each tile is formed of a multi-layer printed circuit board structure including antenna elements and its associated RF circuitry encompassed in a laminated assembly, and wherein each antenna tile can operate by itself, as a phased array, or as a sub-array of a larger array antenna. Each tile can be a highly integrated module that serves as a radiator, a transmit/receive ("TR") module, RF and power manifolds, and the control circuitry, all of which being combined into a single assembly for implementing an active aperture, electronically, scanned, array ("AESA"). Such an architecture is suitable for airborne or space applications. Each phased array can have its own transmit, receive, amplitude, and phase controls.

According to certain embodiments, a zone can be adjusted by physical movement of the corresponding monitoring device (e.g., optical sensor or radar device) or by changing a field of view of the monitoring device. For example, a phased array antenna may be directed to monitor a different field of view by electronically steering the beam.

According to certain embodiments, optical sensors 230 are utilized to monitor an area partially or entirely surrounding the satellite 200. In the direction of a bright light emitting body, such as the sun, an optical sensor 230 can be inadequate to properly detect and monitor objects, due to the intensity of light from the sun. A zone that lies between the satellite 200 and the sun may contain objects that cannot be viewed or resolved adequately by an optical sensor 230. Accordingly, the radar device 260 can be used in combination with the optical sensors 230, so that the zone monitored between the satellite 200 and the sun is monitored by the radar device 260. As the solar panels 224 are adjusted to track the sun, the radar device 260 also is directed toward the sun, so that any optical sensor 230 that is directed toward the sun monitors a zone that has a degree of overlap with a zone monitored by the radar device 260. As such, a system for monitoring does not rely exclusively on the optical sensors 230 for monitoring at least a zone between the satellite 200 and the sun.

According to certain embodiments, as illustrated in FIG. 2, a radar device 260 may be located at a solar panel 224. The solar panel 224 having the radar device 260 may provide power to the radar device 260. As such, the radar device 260 can operate independent of a central power storage of the bus 226 and draw no power form the bus 226. Alternatively or in combination, the solar panel 224 having the radar device 260 may provide power to the radar device 260 and to a central power storage of the bus 226. Alternatively or in combination, the solar panel 224 having the radar device 260 may draw power from a central power storage of the bus 226.

According to certain embodiments, the solar panel 224 having the radar device 260 may operate independently of other components of the satellite 200. For example, the solar panel 224 having the radar device 260 may be a modular component that can be attached to and/or removed from a solar array 220 with minimal interface requirements relative to other components of the satellite 200 (e.g., bus 226).

According to certain embodiments, each solar panel 224 can be connected to one or more adjacent solar panels 224 by a deployment mechanism that facilitates storage and deployment of the solar panels 224. For example, a set of hinges 54 can be provided for pivotally mounting a first solar panel 224 to a second solar panel for mutual rotation about a hingeline defined by the set of hinges. A plurality of solar panels can be provided in the same manner, with a last solar panel at a terminal end of the solar assembly 220. The solar panel 224 having the radar device 260 can be stowed for launch in accordance with techniques employed for storage of other solar panels 224. The solar panel 224 having the radar device 260 can be deployed during orbit in accordance with techniques employed for deployment of other solar panels 224. Accordingly, the solar panel 224 having the radar device 260 can be provided to a satellite by connecting it to the last solar panel 224 at a terminal end of the solar assembly 220.

Figure 3:
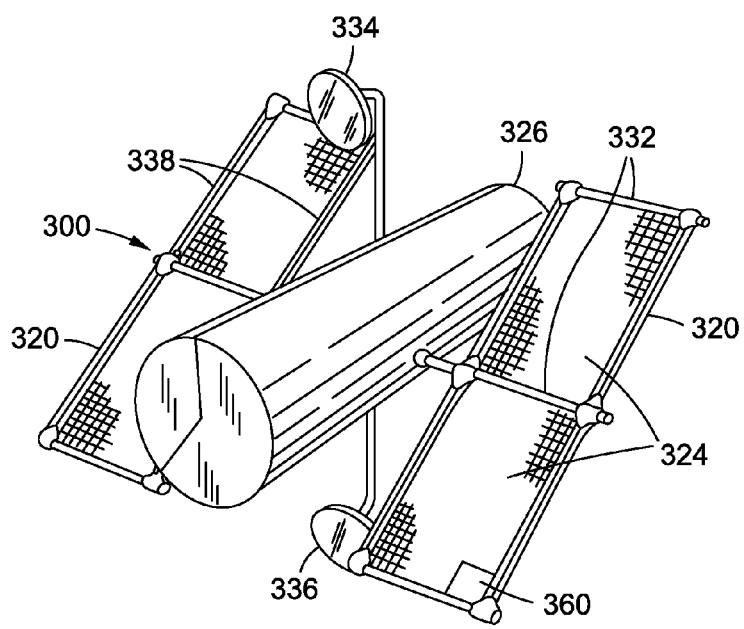
FIG. 3 illustrates a space station having a radar device for sensing objects, according to certain aspects of the present disclosure.

According to certain embodiments, as shown in FIG. 3, a spacecraft 300, such as a space station, provides another arrangement including a bus 326 and a plurality of solar assemblies 320. The spacecraft 300 may further include a transmission antenna 334 and a reception antenna 336. The solar assemblies 320 provide a plurality of large flexible blanket solar panels 324 stretched between pairs of rigid beams 332 and rigid booms 338. The flexible blanket solar panels 324 can be generally larger and less rigid that those illustrated in FIG. 2 and provide for greater power needs.

With regard to the solar assemblies 326 of FIG. 3 utilizing flexible or blanket solar panels 324, when in the stowed condition, each solar panel 324 is rolled up on an axis generally parallel to its associated rigid beam 332. When released from the stowed condition, separation of the rigid beams 332 and/or rigid booms 338 causes the each solar panel 324 to become substantially flat.

According to certain embodiments, optical sensors can be provided on outer surfaces of the bus 326 (not shown). Alternatively or in combination, one or more optical sensors can be provided on one or more solar assemblies 320 (not shown).

According to certain embodiments, one or more radar devices 360 can be provided on or along a solar panel 324 of a solar assembly 320. The radar device 360 can be fixed to a rigid beam 332 and/or a rigid boom 338 such that the radar device 360 has the same orientation as the solar panel 324 supported by the corresponding rigid beam 332 and/or rigid boom 338. Accordingly, the radar device 360 can be directed or aimed in a direction transverse (e.g. orthogonal) to the surface of the solar panel 324 to which it is fixed. As the solar panel 324 is adjusted to track the sun, the radar device 360 also is directed toward the sun, such that a zone monitored by the radar device 360 lies between the satellite 300 and the sun.

Figure 4A:
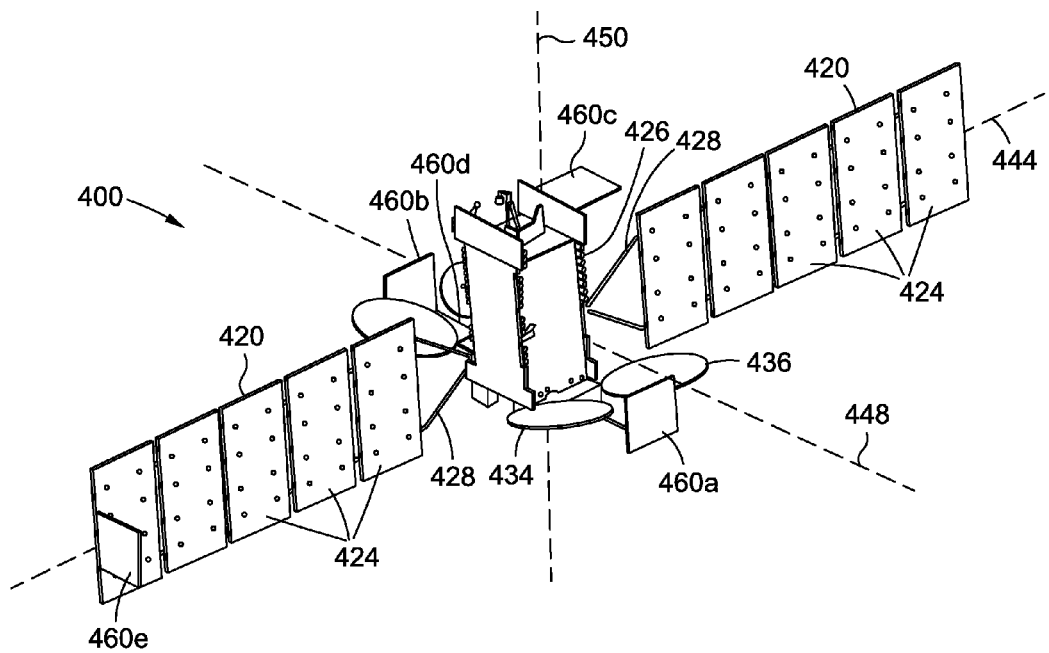
FIG. 4A illustrates a perspective view of a satellite having radar devices for sensing objects, according to certain aspects of the present disclosure.
Figure 4B:
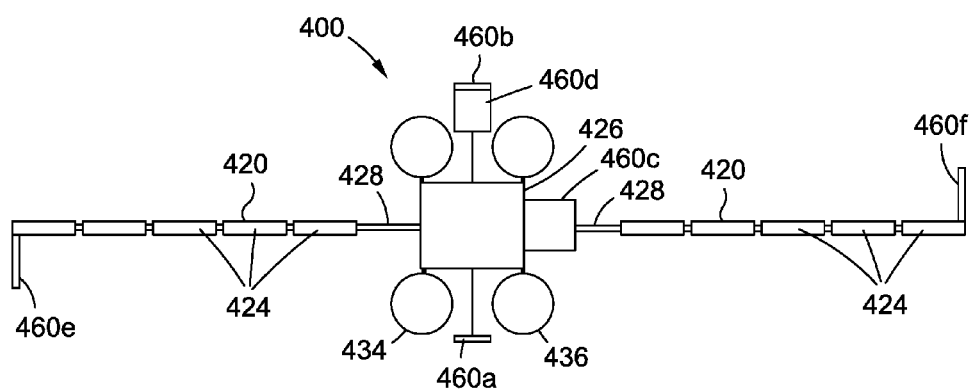
FIG. 4B illustrates a top view of a satellite having radar devices for sensing objects, according to certain aspects of the present disclosure.

According to certain embodiments, as illustrated in FIGS. 4A-B, a satellite 400 includes a bus 426 and one or more solar assemblies 420. The satellite 400 may further include a transmission antenna 434 and a reception antenna 436. Each of the solar assemblies 420 includes one or more solar panels 424. The solar assemblies 420 are each attached to the bus 426 and supported by a yoke 428. The yoke 428 is pivotally mounted on a side of the bus 426 for rotation relative to the bus 426 about a pitch axis 444. In a deployed position, the solar panels 424 of a given solar assembly 420 can be mutually coplanar and extend transversely of the bus 426.

According to certain embodiments, as shown in FIGS. 4A-B, a satellite 400 may detect and monitor objects in nearby zones based on radar systems. Radar devices 460 (e.g., radar devices 460a, 460b, 460c, 460d, 460e, and 460f) can be provided at various locations on the satellite 400. For example, radar devices 460 (e.g., radar devices 460a,b,d) can extend a distance away from an attachment to the bus 426, or radar devices 460 (e.g., radar device 460c) can be mounted directly to the bus 426. By further example, radar devices 460 (e.g., radar devices 460e,f) can be mounted on a solar assembly 420. As shown in FIGS. 4A-B, a radar device 460 located on a solar assembly 420 can be oriented such that it faces a direction parallel to an axis of rotation (e.g., pitch axis 444) of the solar assembly 420. As such, each radar device 460 maintains a substantially similar captured zone in any rotational orientation of the solar assembly 420.

A radar device 460 can be substantially flat. In a deployed position, the radar device 460 may lie in a plane substantially transverse (e.g. orthogonal) to an adjacent solar panel 424. In a retracted position, the radar device 460 may fold against an adjacent solar panel 424.

As shown in FIGS. 4A-B, radar devices 460 can be provided such that the radar devices 460 are each aligned with a coordinate axis. For example, pairs of radar devices 460 can be oriented to face in opposite directions on one of a yaw axis 450, a pitch axis 444, and a roll axis 448. In this arrangement, the three-dimensional space about the satellite hundred can be divided into at least six zones. One or more radar devices 460 can be used to capture images of a space partially or entirely surrounding the satellite 400. The space can be divided into zones, each zone corresponding to a portion of space in which a respective radar device 460 monitors. The zones can be overlapping, contiguous, or separated. According to certain embodiments, the satellite 400 may detect and monitor objects in nearby zones based exclusively on radar systems. For example, the zones monitored by the radar devices 460 can entirely surround the satellite 400. According to certain embodiments, each of one or more radar devices 460 can be a phased array antenna.

Figure 5:
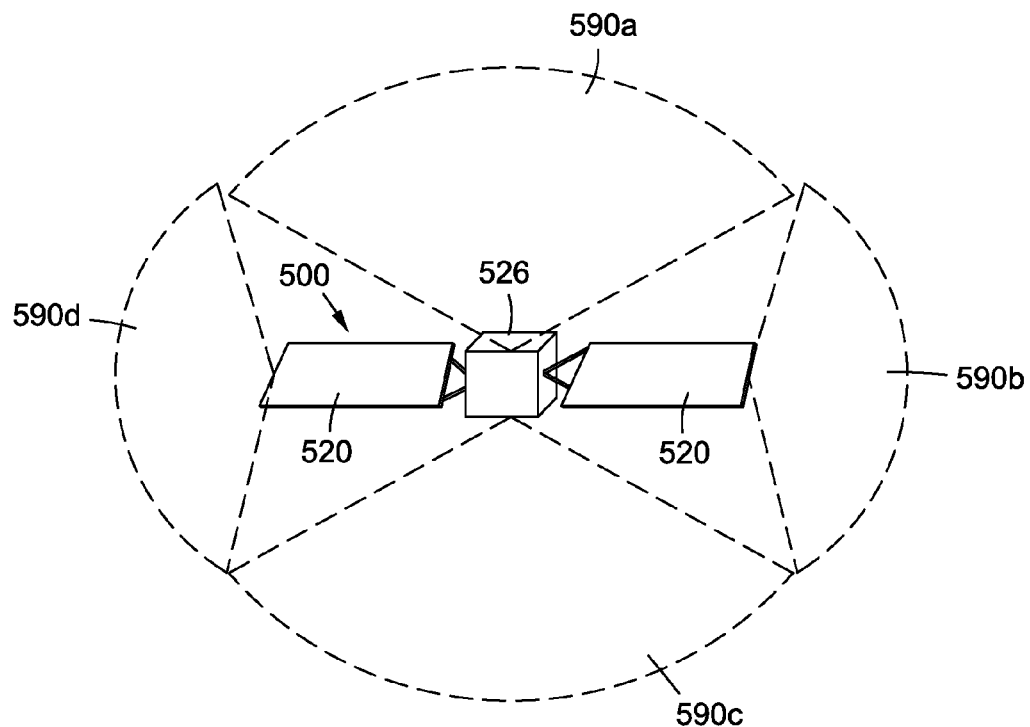
FIG. 5 illustrates a satellite having monitored zones, according to certain aspects of the present disclosure.

According to certain embodiments, as shown in FIG. 5, a satellite 500 can be configured to monitor each of a plurality of zones 590 (e.g., zones 590a, 590b, 590c, and 590d). For example, one, some, or all of the zones 590a,b,c,d can be monitored using optical sensors, as disclosed herein. By further example, one, some, or all of the zones 590a,b,c,d can be monitored using radar devices, as disclosed herein. A monitoring device for monitoring a corresponding zone can be located at either the bus 526 of the satellite 500 or on a solar assembly 520 of the satellite 500. One, some, or all of the monitoring devices can be located on the bus 526. One, some, or all of the monitoring devices can be located on a solar assembly 520. As shown in FIG. 5, a monitoring device located on a solar assembly 520 can be oriented such that it faces a direction parallel to an axis of rotation of the solar assembly 520 to maintain a substantially similar captured zone 590b,d in any rotational orientation of the solar assembly 520. The zones 590a,b,c,d can be overlapping, contiguous, or separated.

Figure 6:
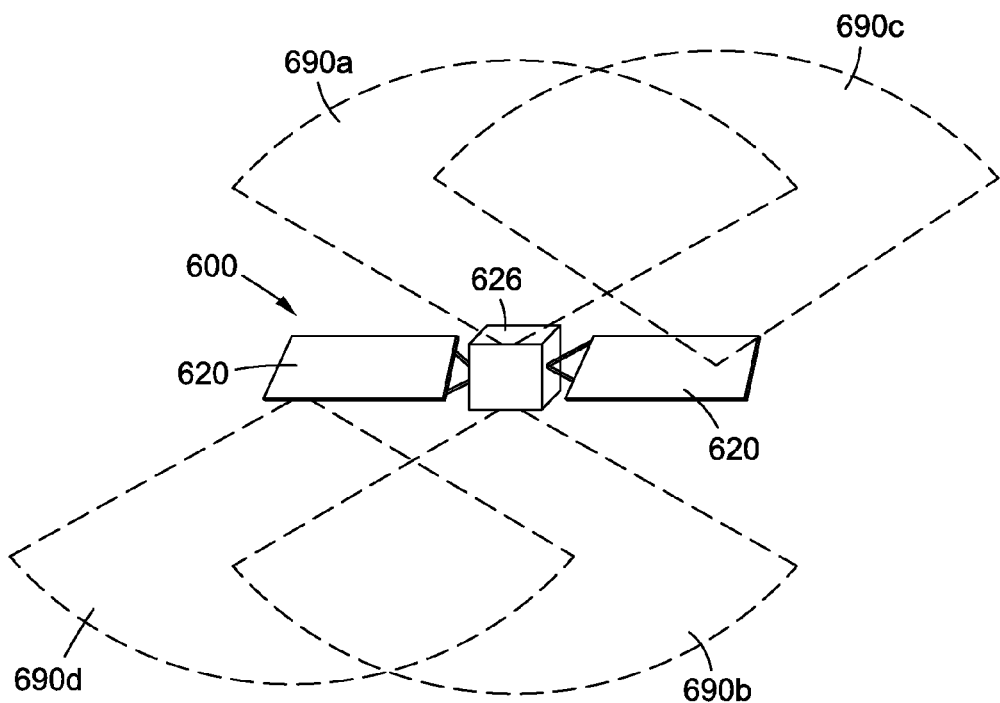
FIG. 6 illustrates a satellite having monitored zones, at least partly determined by the orientation of solar assemblies relative to a bus, according to certain aspects of the present disclosure.

According to certain embodiments, as shown in FIG. 6, a satellite 600 can be configured to monitor each of a plurality of zones 690 (e.g., zones 690a, 690b, 690c, and 690d). For example, one, some, or all of the zones 690a,b,c,d can be monitored using optical sensors, as disclosed herein. By further example, one, some, or all of the zones 690a,b,c,d can be monitored using radar devices, as disclosed herein. A monitoring device for monitoring a corresponding zone can be located at either the bus 626 of the satellite 600 or on a solar assembly 620 of the satellite 600. Some of the monitoring devices (e.g., optical sensors) can be located on the bus 626, and some of the monitoring devices (e.g., radar devices) can be located on a solar assembly 620. As shown in FIG. 6, a radar device located on a solar assembly 620 can be oriented such that it faces a direction transverse (e.g. orthogonal) to an axis of rotation of the solar assembly 620 or a surface of the solar assembly 620 to capture a zone 690c,d that is defined, at least in part, by the rotational orientation of the solar assembly 620. The zones 690a,b,c,d can be overlapping, such that portions of zones 690a,b monitored by optical sensors and fixed relative to the bus 626 are also monitored by radar devices at zones 690c,d.

According to certain embodiments, optical sensors and radar devices of satellites disclosed herein may monitor for objects satisfying a predetermined criteria. For example, monitoring devices may detect parameters such as size, distance, steradian, speed, and/or direction of a nearby object. A control module for the satellite may employ one or more criteria (e.g., thresholds) for one or more detected parameters of a nearby object to determine whether a corresponding action is to be executed. By further example, when an object exceeding a predetermined steradian is detected in one or more zones, a corresponding action can be executed.

According to certain embodiments, optical sensors or radar devices of satellites disclosed herein may be operatively connected to a control module for operation and processing of information generated by the optical sensors or radar devices. Such information can be transmitted by a transmission antenna as a notification signal to the planet when nearby objects are detected. The notification signal can include some or all information gathered by one or more monitoring devices. Instructions may be transmitted from the planet to the satellite to be implemented by the satellite in response.

According to certain embodiments, a control module of a satellite can be configured to implement preprogrammed actions in response to a detected object. For example, a satellite can change its position and orientation relative to a detected object to avoid collision or proximity with the object. Such motion in response to the object can be based on a detected location of the object and/or a detected trajectory of the object. One or more techniques may be employed. For example, gas powered thrusters can be briefly fired to move the satellite. Another technique employs the use of an on-board momentum wheel. Such wheels can be used in a fixed orientation relative to the satellite, or on a gimballed platform. Another technique is the use of magnetically induced torques. Another technique is solar sailing, in which the solar radiation pressure reacting on the solar panels is used to create the desired compensating moments. The control moments generated by solar sailing are obtained by deviating the orientation of at least one of the satellite's solar panels slightly from the normal sun tracking position. When two panels are controlled in a coordinated motion, precise attitude control is possible in a fixed momentum wheel system. In the gimballed momentum wheel system, the amount of gimbal travel required for control can be substantially reduced. In both systems, the use of thrusters for attitude control can be optionally eliminated.

Embodiments of the present invention are described herein with reference to spacecraft. One skilled in the art, however, will appreciate that the arrangements described herein are not limited to spacecraft, but could be used in any number of different environments, including but not limited to airplanes, space shuttles, missiles, ground vehicles, water vehicles, ground stations, and the like. Accordingly, the present invention is not limited to the specific embodiments disclosed herein.

The previous description is provided to enable any person skilled in the art to practice the various aspects described herein. While the foregoing has described what are considered to be the best mode and/or other examples, it is understood that various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "some" and "multiple" refer to one or more. Pronouns in the masculine (e.g., his) include the feminine and neuter gender (e.g., her and its) and vice versa. Headings and subheadings, if any, are used for convenience only and do not limit the invention.

It is understood that the specific configurations disclosed are illustrations of exemplary designs. Based upon design preferences, it is understood that the specific components can be rearranged. In some embodiments, some components can be omitted, relocated, replaced with equivalent items, or combined with other components without departing from the scope of the present invention. In some embodiments, some functions presented as occurring in one component may occur in a different component or be implemented in a different manner. The accompanying claims present elements of the various systems in a sample configuration, and are not meant to be limited to the specific order or hierarchy presented.

It is understood that the specific order or hierarchy of steps in the processes disclosed is an illustration of exemplary approaches. Based upon design preferences, it is understood that the specific order or hierarchy of steps in the processes can be rearranged. In some embodiments, some steps can be performed simultaneously. In some embodiments, steps can be omitted. The accompanying method claims present elements of the various steps in a sample order, and are not meant to be limited to the specific order or hierarchy presented.

Terms such as "top," "bottom," "front," "rear", "above", and "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A satellite comprising:
   a bus;
   one or more optical sensors respectively pointing in one or more first directions and being configured to optically detect objects in one or more first zones extending from the satellite; and
   a solar assembly comprising a solar panel and a radar device, the radar device pointing in a second direction and being configured to detect objects in a second zone, wherein the second direction is different from each of the one or more first directions and extends from the satellite in a direction transverse to a surface of the solar panel.

2. The satellite of claim 1, wherein the solar assembly is rotatable about an axis passing through the bus.

3. The satellite of claim 1, further comprising a control module configured to control an orientation of the solar assembly relative to the bus, to allow the surface of the solar panel to face a sun.

4. The satellite of claim 3, wherein when the surface of the solar panel faces the sun, the second zone extends from the satellite toward the sun.

5. The satellite of claim 1, wherein each of the one or more first directions is different from every other of the first directions.

6. The satellite of claim 5, wherein the radar device comprises a phased array antenna.

7. The satellite of claim 5, wherein the solar assembly further comprises a plurality of solar panels, the radar device is powered by one of the solar panels, and the radar device does not draw power from the bus.

8. The satellite of claim 5, wherein the solar assembly further comprises a plurality of solar panels, wherein each of the plurality of solar panels is connected to an adjacent solar panel by a mechanism, and one of the plurality of solar panels at a terminal end of the solar assembly contains the radar device.

9. A method of detecting objects near a satellite in orbit about a planet, comprising:
   detecting, by one or more optical sensors respectively pointing in one or more first directions, whether objects are present in one or more first zones extending from the satellite; and
   detecting, by a radar device pointing in a second direction, whether objects are present in a second zone, wherein the second direction is different from each of the one or more first directions, and wherein the second zone extends from the satellite toward a sun.

10. The method of claim 9, further comprising orienting a solar assembly of the satellite relative to a bus of the satellite, the solar assembly comprising a solar panel and the radar device, such that a surface of the solar panel faces the sun.

11. The method of claim 10, wherein the solar assembly is oriented such that the second zone extends from the satellite in a direction transverse to a surface of the solar panel.

12. The method of claim 9, further comprising, if an object is detected in the first zone or the second zone, transmitting a notification signal to a remote receiver apart from the satellite.

13. The method of claim 9, further comprising, if an object is detected in the first zone or the second zone, moving the satellite relative to the object.

14. The method of claim 9, wherein each of the one or more first directions is different from every other of the first directions.

15. The method of claim 14, wherein the second zone and the one or more first zones collectively and entirely surround the satellite in three-dimensional space.

16. The method of claim 14, wherein the second zone at least partially overlaps one or more of the first zones.

* * * * *